United States Patent [19]

Feller et al.

[11] Patent Number: 4,984,454
[45] Date of Patent: * Jan. 15, 1991

[54] ENGINE TESTING SYSTEM

[75] Inventors: Roger K. Feller, Canton; Samuel R. Warner, Ypsilanti; Janice D. Capriotti, Novi, all of Mich.

[73] Assignee: Ford Motor Company, Dearborn, Mich.

[*] Notice: The portion of the term of this patent subsequent to Nov. 7, 2006 has been disclaimed.

[21] Appl. No.: 419,569

[22] Filed: Oct. 10, 1989

Related U.S. Application Data

[62] Division of Ser. No. 211,601, Jun. 27, 1988, Pat. No. 4,885,935.

[51] Int. Cl.⁵ .......................................... G01M 15/00
[52] U.S. Cl. ................................................... 73/117.3
[58] Field of Search ................. 73/117.2, 117.3, 118.1; 123/418–420, 436

[56] References Cited

U.S. PATENT DOCUMENTS

| | | | |
|---|---|---|---|
| 4,191,144 | 3/1980 | Nohira et al. | 123/417 |
| 4,242,994 | 1/1981 | Keely | 123/353 |
| 4,275,694 | 6/1981 | Nagaishi | 123/479 |
| 4,344,398 | 8/1982 | Ikeura | 123/339 |
| 4,502,446 | 3/1985 | Kanegae et al. | 123/479 |
| 4,617,898 | 10/1986 | Gayler | 123/470 |
| 4,664,090 | 5/1987 | Kabasin | 73/118.2 |
| 4,696,277 | 9/1987 | Katayama | 73/119 A |
| 4,730,484 | 3/1988 | Olshefski | 73/119 R |
| 4,774,922 | 10/1988 | Morita | 123/425 |
| 4,776,312 | 10/1988 | Yoshioka et al. | 123/436 |
| 4,879,656 | 11/1989 | Quigley et al. | 364/431.04 |

Primary Examiner—Robert Raevis
Attorney, Agent, or Firm—Peter Abolins; Keith L. Zerschling

[57] ABSTRACT

An engine testing system tests an engine at the end of a production line by controlling the fuel charge and ignition spark timing of an operating engine as a function of engine speed and air charge. The test is accomplished without the need for mass air flow and manifold absolute pressure sensors.

7 Claims, 3 Drawing Sheets

ENGINE TESTING SYSTEM

This is a division of application Ser. No. 211,601, filed June 27, 1988, now U.S. Pat. No. 4,885,935.

BACKGROUND OF THE INVENTION

1. Technical Field

This invention relates to an engine testing system.

2. Background Art

After fabrication of an engine, it is typically desirable to test the engine to insure correct operation. This often presents difficulties which are not present when the engine is installed in the car. For example, certain sensors needed for engine operation may not yet have been installed. Of course, all missing sensors could be temporarily installed and the engine tested on an engine dynamometer installation. However, such an installation is relatively expensive to maintain, each engine test may take a relatively long time, and the test results are dependent upon sensors which are present only during the test and are not the same ones later installed on the engine. When many engines are being produced, the total time and cost of testing the engines may be substantial.

It would be advantageous to have an engine control system suitable for testing an engine at the end of a production line which is accurate, has reduced cost, and avoids the need for pressure sensors, airflow meters and complex control modules. These are some of the problems this invention overcomes.

SUMMARY OF THE INVENTION

An engine testing system in accordance with an embodiment of this invention has an air charge determination means which generates an indication of engine air charge. The engine testing system further includes a table defining an engine operating parameter as a function of both engine speed and adaptive engine air charge. For example, such a table can be a spark table defining engine ignition spark timing as a function of both engine air charge and engine speed or a fuel multiplier table defining a fuel charge adjustment applied to the engine as a function of both normalized throttle angle and engine coolant temperature Advantageously, for each table, air charge is defined by throttle angle. Thus an engine testing sYstem in accordance with an embodiment of this invention can provide interactive, adaptive control for spark timing, fuel injection, and idle speed control using throttle angle and engine speed as primary inputs.

As a result, end of line engine testing can be accomplished without the need for mass airflow sensors or manifold absolute pressure sensors. Such engine testing using interactive control of engine operation with adaptive throttle angle and engine speed as primary inputs is available at a relatively low cost. The low cost advantage is obtained, in part, because of the capability for inferring air charge through the measurement of throttle position and avoiding the use of a manifold absolute pressure sensor Advantageously, the engine testing system does make use of a throttle position sensor, an engine coolant sensor, an idle speed control valve, an ignition system, fuel injectors, a fuel rail and an engine wiring harness.

DETAILED DESCRIPTION OF THE INVENTION

In accordance with an embodiment of this invention, a speed throttle engine testing system 10 (FIG. 1) utilizes throttle angle as a load determination instead of, for example, measured mass air flow or calculated speed density. The throttle angle is a primary input to the control of spark timing, fuel injection and idle speed. Adaptive strategies are utilized to reduce the need for additional sensors. For example, an adaptive strategy can be based on feedback as a function of minimum throttle position.

Figure 1:
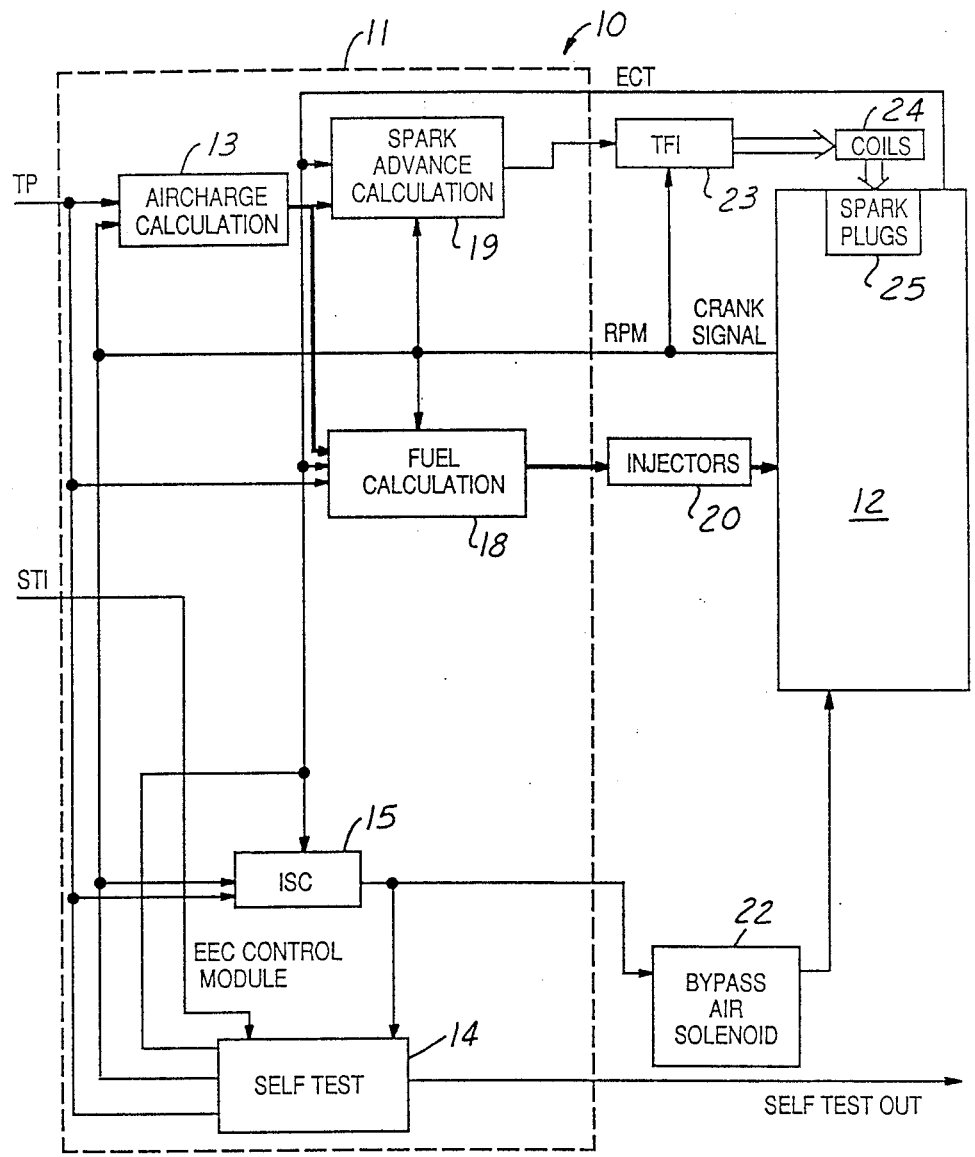
FIG. 1 is a block diagram of an engine testing system in accordance with an embodiment of this invention.

Referring to FIG. 1, speed throttle engine testing system 10 includes an electronic engine control (EEC) module 11 coupled to an engine 12. EEC module 11 includes the following signal processing and storage: air charge calculation module 13, self test module 14, idle speed control (ISC) module 15, fuel calculation module 18 and spark advance calculation module 19.

Fuel calculation module 18 has an output applied to fuel injectors 20 which are coupled to engine 12. If desired, a heated exhaust gas oxygen sensor can be used to provide feedback correction of engine air/fuel ratio. Idle speed control (ISC) module 15 applies a signal to a bypass air solenoid 22 which in turn is coupled to a fuel charging assembly of engine 12. Spark advance calculation module 19 provides an output to a thick film ignition (TFI) module 23 which applies current to ignition coils 24 which in turn are coupled to spark plugs 25 of engine 12. A signal representing engine coolant temperature (ECT) is applied front: engine 12 to spark advance calculation module 19, fuel calculation module 18, and idle speed control module 15. A signal representing instantaneous throttle position (TP) is applied to air charge calculation module 13, fuel calculation module 18, and idle speed control module 15.

Figure 2:
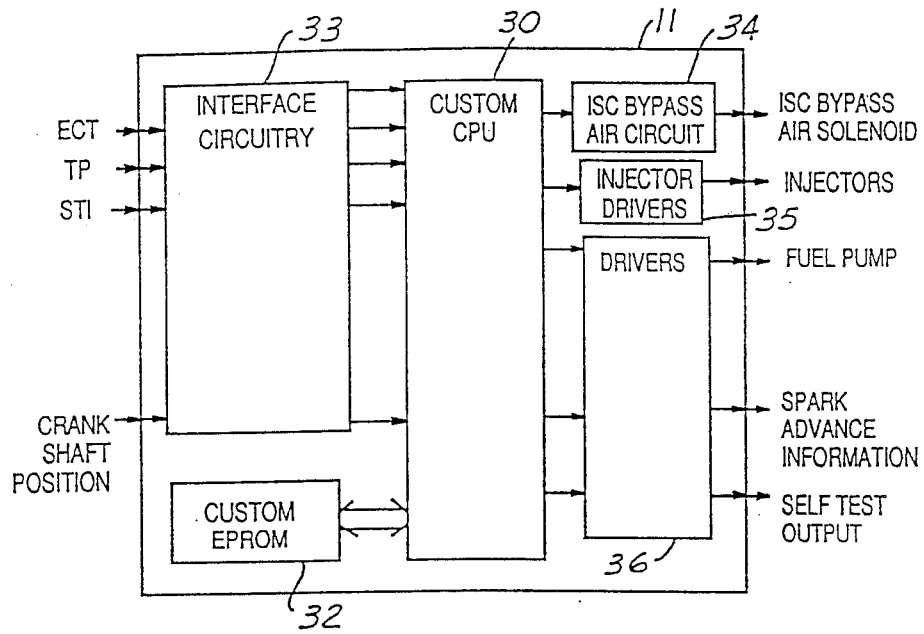
FIG. 2 is a block diagram of a control module portion of FIG. 1, in accordance with an embodiment of this invention.

Referring to FIG. 2, the structure of electronic engine control module 11 is shown in block diagram. A custom central processing unit (CPU) 30 is coupled by two way communication to a custom electrically programmable read only memory (EPROM) 32. Custom CPU 30 is used to store the base spark table and the base fuel table information. CPU 30 receives signals from interface circuitry 33, and supplies signals to an idle speed control (ISC) bypass air circuit 34, injector drivers 35, and auxiliary drivers 36.

Drivers 36 have outputs to a fuel pump, a self test output and spark advance information. Interface circuitry 33 receives signals supplying information characterizing engine coolant temperature (ECT), throttle position (TP), self test input switch (STI), and crankshaft position. Since the engine management system in accordance with an embodiment of this invention uses throttle position for engine load indication, the accuracy of the throttle position sensor is relatively more important than the accuracy of the other sensors. Using adaptive correction, the lowest throttle position reading is assumed to be a closed throttle reading. This closed throttle position reading is used as a base for other throttle position readings indicating how much the throttle is open. Idle speed control bypass air circuit 34 provides a duty cycle output to the idle speed control bypass air solenoid. Injector drivers 35 have an output to fuel injectors.

Figure 3B:
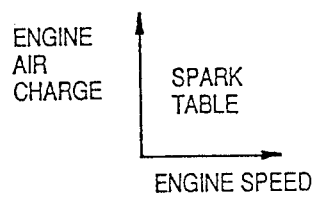
FIG. 3B is a table representing spark advance with respect to engine air charge and engine speed.
Figure 3C:
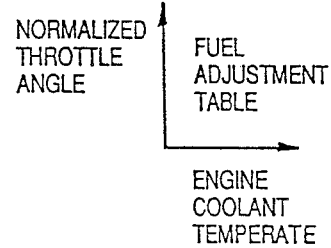
FIG. 3C is a table representing the magnitude of a fuel adjustment to be supplied with respect to normalized throttle angle and engine coolant temperature.
Figure 3A:
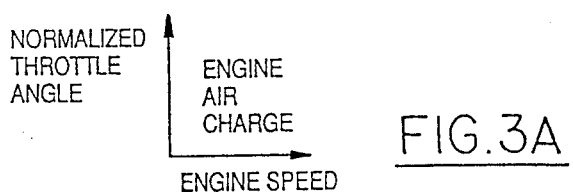
FIG. 3A is a table representing engine air charge with respect to normalized throttle angle and engine speed.

Engine test system 10 uses three tables as indicated in FIGS. 3A, 3B and 3C. In FIG. 3A, an engine air charge table is a function of normalized throttle angle and engine speed. When a value for air charge is determined from the table of FIG. 3A, the air charge value is used as one axial input for the table in FIG. 3B. In FIG. 3B, the spark table is a function of engine speed on one axis and of engine air charge on the other axis. In FIG. 3C, a fuel adjustment table is a function of engine coolant temperature and normalized throttle angle.

Figure 4:
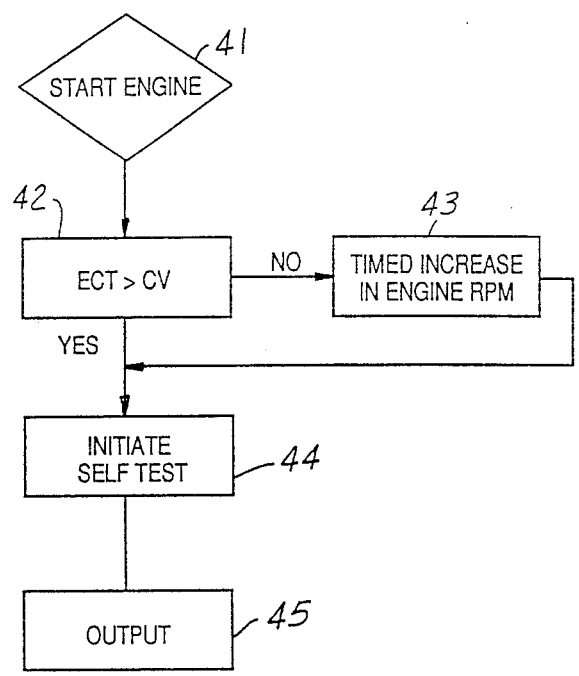
FIG. 4 is a logic flow block diagram of the operation of an engine control system in accordance with an embodiment of this invention.

Referring to FIG. 4, a block diagram illustrates the logic which occurs within (EEC) control module 11 which is coupled to engine 12 during engine testing. Interactive operation of an engine testing control system in accordance with an embodiment of this invention begins at block 41 with START. The logic sequence then goes to a block 42 where an engine warmup is determined by checking to see if the coolant temperature (ECT) is greater than a calibrated value (CV). Advantageously, the engine control strategy for idle speed is such as to run an engine at sufficiently high speeds to increase engine coolant temperature sufficiently fast for a relatively quick engine test. That is, the high speed idle engine operation is extended compared to normal operation of an engine installed in a car. If engine coolant temperature is below the calibrated value, logic flow proceeds to block 43 wherein there is provided an increase in engine speed for a predetermined time duration. If engine coolant temperature is greater than the calibrated value at block 42 or the timed duration of increased engine speed at block 43 has been complete, logic flow goes to a block 44 wherein engine self testing is initiated. The results of the self test are displayed at an output 45.

Figure 5:
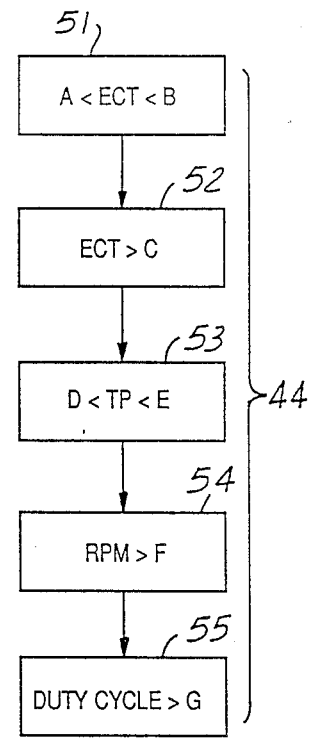
FIG. 5 is a logic flow block diagram of a portion of the logic flow block diagram of FIG. 4.

Referring to FIG. 5, a further breakdown of initiate self-test block 44 includes blocks 51 through 55, wherein various checks are performed and the results stored for output at block 45. Block 51 determines whether or not ECT is within a predetermined temperature range defined by magnitudes A and B. Block 52 determines whether or not ECT is above some predetermined temperature magnitude C. Block 53 determines whether or not throttle position is within a predetermined angular position range defined by angular positions D and E. Block 54 determines whether engine RPM is greater than predetermined magnitude F. Block 55 determines whether or not the duty cycle of the signal applied to the engine idle speed control valve is above a predetermined value G.

During operation of engine test system 10 the initial ECT sensor input determines the RPM at which to run the engine. Engine speed is controlled by the ISC valve.

Self test block 44 makes determinations for: (a) ECT and TP outside the range of predetermined limits, (which may indicate either a fault in the engine electrical wiring harness or in the sensor itself); (b) ECT too low, (which may indicate that the sensor is faulty); (c) idle engine speed too low, (which may indicate that the ISC valve does not function or there is a fault in the engine wiring harness); (d) ISC duty cycle too low, (which may indicate that undesired air is being drawn in, e.g. a vacuum leak or a throttle plate that was not adjusted properly). Accordingly, engine testing system 10 allows the running of different types of engines with one single relatively low cost engine test system and verifies the integrity and functionality of the engine, engine wiring harness, ECT and TP sensors as well as idle speed control valve operation.

Various modifications and variations will no doubt occur to those skilled in the art to which this invention pertains. For example, the particular engine test module functional structure can be varied from that disclosed herein. These and all other variations which basically rely on the teachings through which this disclosure has advanced the art are properly considered within the scope of this invention.

We claim:

1. An engine testing system for testing an engine having an engine throttle, by determining engine load based upon engine air charge comprising:

an air charge determination means coupled to said engine for determining engine air charge and generating a signal as a function of engine air charge which defines engine load by using a throttle position sensor for sensing the angle of the engine throttle and generating a signal as a function of engine throttle angle and thus as a function of engine air charge which defines engine load;

storage means for storing, as a function of engine speed and engine air charge, a desired engine operating parameter in a first table;

an engine speed sensor coupled to said engine for sensing engine speed and generating a signal as a function of engine speed;

reference means for storing a base air charge as a function of engine speed; and a logic operation means coupled to said storage means, said reference means and said engine speed sensor for determining the desired engine operating parameter by using the determined air charge to determine a position on the air charge axis of said first table and using the sensed engine speed to determine a position on the engine speed axis of said first table, thereby determining the desired engine operating parameter for engine operation.

2. An engine testing system for testing an engine as recited in claim 1 wherein said storage means stores desired engine spark timing in said first table as a function of engine speed and engine air charge.

3. An engine testing system for testing an engine as recited in claim 2 wherein said storage means stores desired engine fuel charge adjustment in a second table as a function of engine coolant temperature and normalized throttle angle.

4. An engine control system as recited in claim 3 further comprising idle speed control means coupled to said logic operation means for controlling actual idle speed as a function of the desired engine idle speed resulting in a control of fuel and spark to maintain idle stability and promote relatively rapid increase in engine coolant temperature.

5. An engine testing system for an engine having an engine throttle, said engine testing system using throttle angle as an indication of engine load and comprising:
   a throttle position sensor coupled to said engine for sensing the angle of said engine throttle and generating a signal as a function of engine throttle angle;
   a table memory storing desired engine spark timing in a first table as a function of engine speed and engine air charge, and desired engine fuel charge adjustment in a second table as a function of engine coolant temperature and normalized throttle angle;
   an engine speed sensor coupled to said engine for sensing engine speed and generating a signal as a function of engine speed;
   an engine coolant temperature sensor coupled to said engine for sensing engine coolant temperature and generating a signal as a function of engine coolant temperature;
   a reference memory storing a reference engine speed; and
   a computer processor coupled to said throttle position sensor, said table memory, said reference memory, said engine speed sensor and said engine coolant temperature sensor for determining desired engine operating parameters by using the sensed engine throttle angle to determine a position on the air charge axis of said first table and using the sensed engine speed to determine a position on the engine speed axis of said first table thereby determining the desired spark timing, and using normalized throttle angle to determine a position on the throttle angle axis of said second table and using the sensed engine coolant temperature to determine a position on the engine coolant temperature axis of said second table thereby determining the desired engine fuel charge adjustment for engine operation.

6. An engine testing system as recited in claim 5 further comprising an idle speed controller coupled to said computer processor.

7. An engine testing system as recited in claim 6 wherein said computer processor includes:
   interface circuitry coupled to receive signals indicating engine coolant temperature, throttle position and crankshaft position;
   an electrically programmable read only memory;
   a central processing unit coupled to said interface circuitry and said electrically programmable read only memory; and
   drivers coupled to said central processing unit for actuating a fuel pump, fuel injectors and said idle speed controller.

* * * * *